July 3, 1962    A. E. FRIEDMAN ETAL    3,041,709
MANUFACTURE OF BLOWER WHEELS
Filed April 23, 1956    2 Sheets-Sheet 1
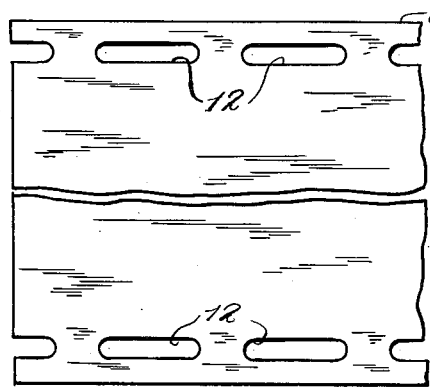
FIG. 1
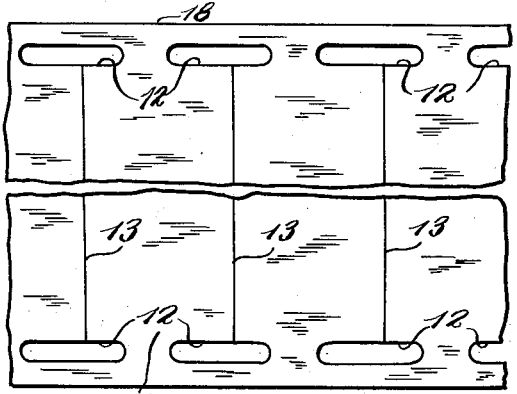
FIG. 2
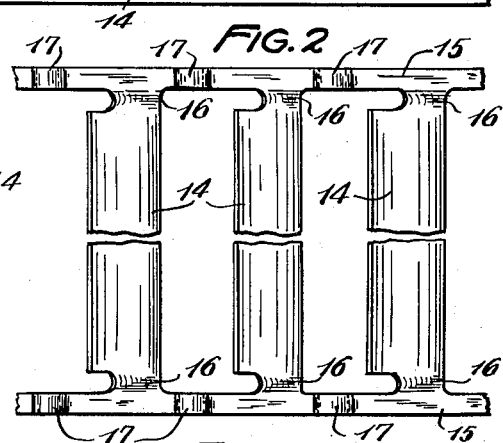
FIG. 3
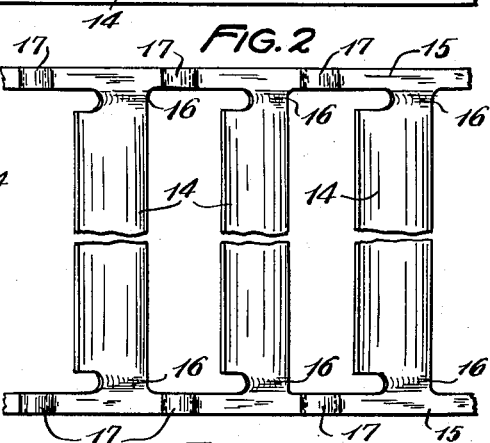
FIG. 4
FIG. 5
FIG. 6
FIG. 7
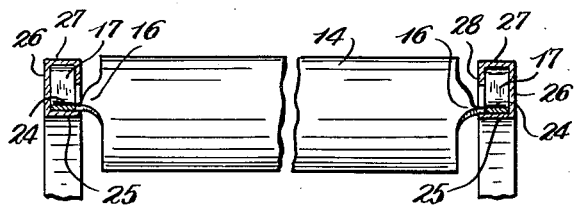
FIG. 9                                    FIG. 8
INVENTORS
EMMETT F. KENNEDY
ARTHUR E. FRIEDMAN
BY RICHEY, WATTS, EDGERTON & McNENNY
ATTORNEYS July 3, 1962

A. E. FRIEDMAN ETAL 3,041,709

MANUFACTURE OF BLOWER WHEELS

Filed April 23, 1956

INVENTORS
EMMETT F. KENNEDY
ARTHUR E. FRIEDMAN

BY RICHEY, WATTS, EDGERTON & McNENNY

ATTORNEYS

United States Patent Office 3,041,709
Patented July 3, 1962

3,041,709
MANUFACTURE OF BLOWER WHEELS
Arthur E. Friedman, Shaker Heights, and Emmett F. Kennedy, Maple Heights, Ohio, assignors to Air Controls, Inc., Cleveland, Ohio
Filed Apr. 23, 1956, Ser. No. 579,785
3 Claims. (Cl. 29—156.8)

This invention relates to the manufacture of blowers, and more particularly to an improved method for forming blower wheels and the like.

Blower wheels are being produced by forming an annulus or cylinder having a series of elongated substantially parallel sheet metal blades, formed from a single sheet of material, by the operations of slitting, slotting and forming the blade ends into integral end ring portions. In such constructions the continuous annular ring members, formed by such operations, are crimped or bent into two or more planes each requiring a separate forming operation. The blade end ring members are then secured to the blower wheel end rings by a soldering or similar operation.

We have discovered that by crimping the material at ends of the blades, hereinafter referred to as blade end rings, to form a series of similar loops disposed in a plane at right angles to the plane of the blades, one forming step is eliminated, and that by rolling the blower wheel rings over and around the blade end rings, the same may be placed under tension and the blade end ring loops under compression over and around the blade end rings, and firmly retained thereby without soldering or otherwise securing these parts together.

Therefore, objects of this invention are to provide a blower wheel having the blade ends crimped in one plane only, and to provide a series of blade forming operations which may be accomplished by a machine in a series of successive steps.

Another object is to provide blade end rings of such configuration and design that the blower wheel rings may be easily rolled around such blade end rings, placed under compression by the loops formed therein and retained solely by such compression, without soldering or otherwise joining such two rings.

Another object is to provide increased blade end air inlet area due to the particular construction of the blower wheel end rings.

Another object of the invention is to provide guide means in the material for accurately locating the blade sheet material as it moves by successive steps through a forming machine, and thereby prevent slippage, over or under feeding of the material.

Another object is to provide substantially greater blade length from a given width of material by decreasing the width of the blade ring end formation.

Other objects are to provide a blower wheel adapted to be produced at a relatively low cost, such wheel being efficient in operation, sturdy and reliable in operation.

Other and further objects will be apparent during the course of the following specifications. In the drawings forming a part of this specification:

FIG. 1 is a broken view of a sheet of material from which the blower wheel is fabricated showing blade end slots formed therein;

FIG. 2 is a view corresponding to FIG. 1 showing slits defining the separate blades;

FIG. 3 shows the blades formed in a curved cross-sectional configuration;

FIG. 4 shows the blades in final position with loops formed on the blade end rings;

FIG. 5 is an end view of FIG. 2;

FIG. 6 is an end view of FIG. 3;

FIG. 7 is an end view of FIG. 4;

FIG. 8 is a broken sectional view of a blower wheel end ring, illustrating manner of crimping it around blade end ring;

FIG. 9 is a broken cross-sectional view through a completed blower wheel illustrating the finished position of the blower wheel rings bent around the blade end rings;

FIG. 10 is a sectional view of finished blower wheel taken on the line 10—10 of FIG. 11, while

Figure 10:
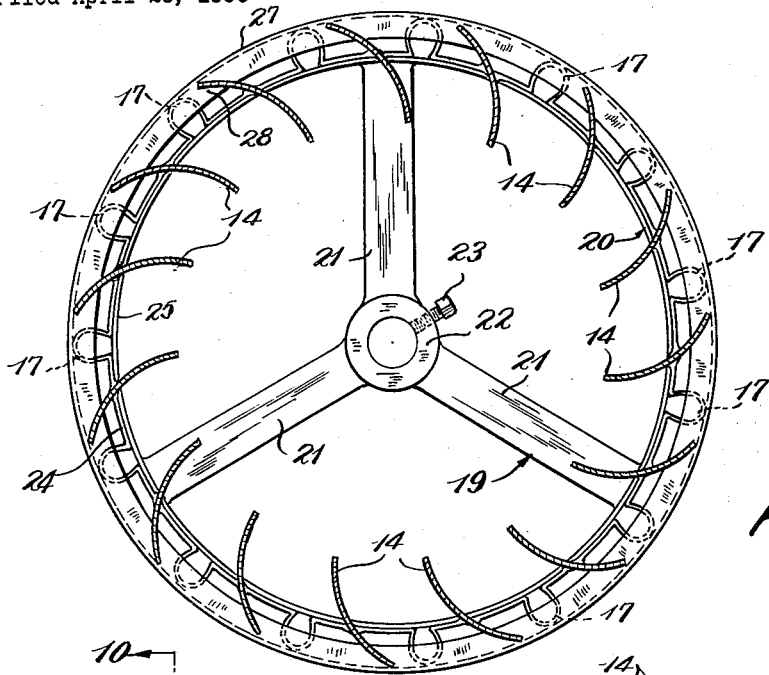
Figure 11:
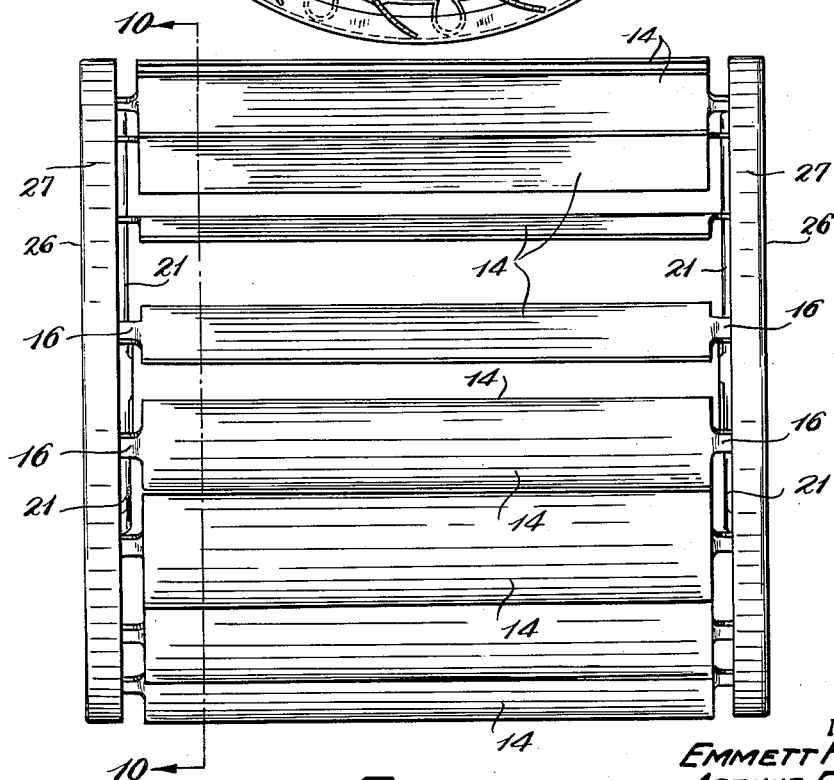
FIG. 11 is a side view of a finished blower wheel.

Briefly, the method of forming blower wheels described herein comprises the following steps: A flat strip of thin sheet material of requisite width is provided, and a series of slots are punched along each margin of the strip. The material is then slit transversely between slots forming a series of separate blower blades. A transverse curvature is then imparted to the blades while they are still in the general plane of the sheet of material. The blades are then turned so that they are disposed in a general parallel relation to each other with the blade end portions, leaving a continuous flat band at each blade end, and portions of the blade end bands disposed between the series of blades are bent outwardly of the plane of the band forming a transversely disposed loop between each blade end, which brings the blades closer together into their final spaced relation. The blade end rings are then severed into lengths corresponding to the predetermined circumference of the finished blower wheel, the blade end rings are formed into two rings connected by the blades, and the ring ends are united by a brazing or welding operation. A flat blower wheel ring secured to a spider is the rolled around and over each blade end ring in such manner that the blade end loops are under sufficient compression to firmly retain the parts together without the use of soldering, welding or otherwise securing the parts together.

The first step in manufacturing this blower wheel consists of securing a strip of material, such as sheet steel or the like, having a width corresponding to the predetermined length of the blower blades and blade end rings. In the drawings the letter "S" refers to such a strip of material, in which is punched a series of slots 12 along each side margin of the material, which is followed by a slitting operation connecting the series of slots, by slits indicated by the numeral 13 forming separate blades 14. The material then may be inserted in an automatic forming machine in such manner that the series of slots 12 may be engaged by a finger or guiding mechanism of the machine for accurately retaining this strip as it progresses through the machine. The strip of material then having the slots 12 and the slits 13 formed therein is placed in forming machines and the material between successive slits 13 is given a somewhat arcuate cross-sectional contour as illustrated in FIGS. 4 and 6, providing individual blades indicated by the numeral 14.

The blades 14 are then twisted longitudinally to substantially the position they will occupy in the finished blower wheel as illustrated in FIG. 7, while that portion of the strip of material disposed outwardly of the slots 12 is retained in its flat condition, and is referred to herein as band 15 connected to the ends of the blade by twisted blade end formations 16.

As illustrated in FIGS. 4 and 7 a series of spaced blade loops 17 are formed in the two bands 15, said loops 17 extending in the same direction from each band 15, and are disposed at right angles to the axes of said blades 14. A length of strip "S" having blades 14 connected to end bands 15, as above described, and corresponding to the predetermined circumference of the finished blower wheel, is then severed and formed into a cylinder 20 with the loops 17 extending outwardly from the bands 15 at each end of the blades 14, said bands 15 being hereinafter referred to as blade end rings 18.

The cooperating ends of the blade end rings 18 are then suitably joined together by soldering or brazing operation. At this point it should be noted that a series of spaced loops 17 projecting radially from the blade end rings 18 are relatively narrow in width whereby a relatively small proportion of blade end is required for such construction.

A spider 19 is then prepared for each end of the cylinder 20, comprising spokes 21 radiating from a hub 22 which is adapted to be secured to a blower wheel axle by means of a set screw 23, while the outer ends of the spokes 21 are secured to blower wheel rings 24 by soldering or in any suitable manner. The blower wheel rings 24 preferably are made of readily deformable material in order that they may be rolled over the blade end rings 18 and loops 17 hereinafter described.

A spider 19 is then disposed at the end of cylinder 20 in the position it occupies in the blower wheel, at the time the blower wheel rings 24 are of flat formation and a portion 25 of blower wheel ring 24 is retained against blade end ring 18 and along the open ends of the loops 17, while portion 26 of ring 24 is caused to assume a position at right angles to the portion 25 and along outer sides of the loops 17, and the portion 27 is bent around and over the closed ends of the loops 17 in a position parallel to the portion 25. The narrow ring portion 28 is caused to assume a position parallel to the ring portion 26 as disclosed in FIGS. 8 and 9. By thus bending the portions 26, 27 and 28 of the blower wheel ring 24, as shown, and placing the loops 17 of the blade end rings 18 under compression, it has been discovered that no other means are required for uniting said part such as brazing or soldering operations normally required for joining the two rings together, which represents a substantial saving in the cost of manufacturing.

Disposing the loops 17, at right angles to the axis of the blower wheel as described herein, not only provides for firmly securing the blade end rings to the blower wheel ring by a mechanical or compression lock, but requires substantially less material for the blade end ring than conventional blade constructions, and thus permits greater blade length and provides better performance because the exposed wheel blades are more open mechanically at the ends and therefore pull air through the blower venturi at a sharper angle, thus utilizing a larger area of outside diameter of the wheel.

It will be apparent to those skilled in the art that the present embodiment of the invention is illustrative only and that the invention may be variously changed, used or modified without departing from the spirit of the invention or sacrificing the advantages thereof.

We claim:

1. A method of forming a blower wheel comprising, severing a strip of sheet metal at spaced points by punching longitudinal rows of elongated openings adjacent marginal edges of the strip and slitting the strip from intermediate the ends of the openings of one row to intermediate the ends of the openings of the other row thereby dividing said strip into sections having connecting portions connecting the sections with the marginal edges of the strip, forming said sections into blades, deflecting said blades to an angular position, bending portions of said marginal edges upwardly from the plane thereof to form a series of locking members spaced apart and interconnected by portions of said marginal edges intermediate the portions from which the locking members are formed, said locking members having closed ends spaced from said intermediate portions and legs extending upwardly from said intermediate portions and interconnected in spaced relation by said closed ends, forming said strip into a cylinder with said locking members extending substantially radially thereof, providing blower wheel rings of material capable of being readily bent, and bending said rings transversely around and into tight engagement with the closed ends of said radially extending locking members and said intermediate portions of the marginal edges to compress said locking members substantially radially whereby the locking members, when bending of said rings is complete, are under substantially radial compression and said rings are under tension to retain the rings in place relative to said marginal edges.

2. A method of forming a blower wheel comprising, severing a strip of sheet metal at spaced points by punching longitudinal rows of elongated openings adjacent marginal edges of the strip and slitting the strip from intermediate the ends of the openings of one row to intermediate the ends of the openings of the other row thereby dividing said strip into sections having connecting portions connecting the sections with the marginal edges of the strip, forming said sections into blades, deflecting said blades to an angular position, forming a series of relatively deep open loops in said marginal edges projecting perpendicular deep open loops to the plane of the marginal edges and having closed ends spaced from said plane, said loops being spaced apart and interconnected by portions of said marginal edges intermediate the loops, forming said strip into a cylinder with said loops extending substantially radially outwardly thereof, providing spiders including relatively annular blower wheel rings of material capable of being radially bent, and bending said rings by a rolling operation substantially completely around and into tight engagement with the closed ends of said radially extending loops and said intermediate portions of said marginal edges to compress said loops substantially radially whereby the loops, when bending of said rings is complete, are under substantially radial compression and said rings under tension to retain the rings in place relative to said marginal edges.

3. A method of forming a blower wheel comprising, providing an elongated strip of sheet metal having a width slightly in excess of the predetermined length of the blades, cutting a row of elongated slots adjacent marginal edges, of said strip and generally parallel to the marginal edges, transversely slitting the strip from intermediate the ends of the slots adjacent one marginal edge of the strip to intermediate the ends of the slots adjacent the other marginal edge of the strip thereby providing a series of blades attached at their ends to said marginal edges by means of webs formed between successive slots in each row, imparting similar transverse curved configurations to the blades in the general plane of the sheet while retaining the marginal edges of the strip in a flat condition, twisting said blades longitudinally to face each other in substantially the angular position they retain in the finished wheel, forming a series of generally U-shaped loops in said marginal edges intermediate the ends of said slots and perpendicular to the plane of the marginal edges, said loops being spaced apart and interconnected by portions of said marginal edges intermediate the loops and having closed ends spaced from said plane, severing the marginal edges of the strip at lengths corresponding to the circumference of the finished wheel, forming said marginal edges into blade rings connected to the outer ends of said blades with said loops extending radially outwardly from the blade rings, and permanently uniting the ends of said blade rings together in the form of a cylinder, providing annular blower spiders including a hub and radiating spokes joined at their outer ends by blower wheel rings, and bending said blower wheel rings into generally rectangular cross sectional shape over and around said blade rings and into tight engagement with the closed ends of said radially extending loops and said intermediate portions of said marginal edges to compress said loops radially whereby the loops, when bending of said wheel rings is complete, are under substantially radial compression and said wheel rings under tension to retain the wheel rings in place relative to said blade rings.

(References on following page)

References Cited in the file of this patent

UNITED STATES PATENTS

| | | |
|---|---|---|
| 2,080,593 | Albert | May 18, 1937 |
| 2,195,869 | Rathbun | Apr. 2, 1940 |
| 2,242,586 | Marbach | May 20, 1941 |
| 2,291,480 | Marbach | July 28, 1942 |
| 2,315,407 | Evans | Mar. 30, 1943 |
| 2,684,521 | Morrison | July 27, 1954 |
| 2,771,241 | Sprouse | Nov. 20, 1956 |
| 2,833,464 | Sharp | May 6, 1958 |